United States Patent [19]

Tokarz et al.

[11] Patent Number: 4,864,473
[45] Date of Patent: Sep. 5, 1989

[54] ELECTROLUMINESCENT DOME LIGHT FOR A CONVERTIBLE AUTOMOBILE

[75] Inventor: Stephen Tokarz, Lincoln Park; Edward L. Speck, Dearborn Heights, both of Mich.

[73] Assignee: ASC Incorporated, Southgate, Mich.

[21] Appl. No.: 169,743

[22] Filed: Mar. 21, 1988

[51] Int. Cl.$^4$ .............................................. F21V 9/16
[52] U.S. Cl. ..................................... 362/84; 362/74; 427/66
[58] Field of Search ............... 362/61, 80, 74, 84, 362/253; 40/544, 591, 593; 427/66

[56] References Cited

U.S. PATENT DOCUMENTS

| | | | |
|---|---|---|---|
| 2,733,367 | 1/1956 | Gillson, Jr. | 40/544 |
| 2,920,186 | 1/1960 | Timoff et al. | 362/74 |
| 3,161,974 | 12/1964 | Blockson | 40/544 |
| 3,313,652 | 4/1967 | Blazek et al. | 427/66 |
| 3,317,722 | 5/1967 | Whitney | 362/84 |
| 4,138,620 | 2/1979 | Dickson | 40/544 |
| 4,494,326 | 1/1985 | Kanamori | 362/84 |
| 4,593,228 | 6/1986 | Albrechtson et al. | 427/66 |
| 4,645,970 | 2/1987 | Murphy | 40/544 |
| 4,684,353 | 8/1987 | de Souza | 427/66 |
| 4,721,883 | 1/1988 | Jacobs et al. | 427/66 |

FOREIGN PATENT DOCUMENTS 335795  5/1972  U.S.S.R. ............................... 362/84

Primary Examiner—Ira S. Lazarus
Assistant Examiner—D. M. Cox
Attorney, Agent, or Firm—Arnold S. Weintraub

[57] ABSTRACT

The invention is an electroluminescent dome light for a convertible vehicle. The lighting element consists of a thin piece of electrically conductive material, which is specially treated with an electroluminescent coating. The element is enclosed in a phosphorous treated laminate which provides structure and diffuses the light emitted, giving it qualities of incandescent light. Two electrical connectors attach to the element to provide a means for generating an electrical current though the conductive material. The lighting element is held in place on the headliner of the convertible by a housing, with a means of attachment.

14 Claims, 1 Drawing Sheet

ELECTROLUMINESCENT DOME LIGHT FOR A CONVERTIBLE AUTOMOBILE

BACKGROUND OF THE INVENTION

1. Field of the Invention

The present invention concerns an electroluminescent dome light for use in a convertible top vehicle.

2. Prior Art

As is known to those skilled in the art to which the present invention pertains, lighting in convertible-type automobiles has been limited to lamps, or bulbs disposed in pillars or under the dashboard. Such lighting is inadequate for reading or locating objects in a dark automobile. In the past there has been no dome light available for convertible-type automobiles to provide, brighter, and better placed lighting, because of the inflexibility and bulk associated with such conventional light.

Thus, it is to be appreciated that there exists a need for better interior lighting within such vehicles and it is to this the present invention is directed.

SUMMARY OF THE INVENTION

The present invention defines an electroluminescent dome light for a convertible-type vehicle comprising:
  (a) a lighting element, comprising:
    (1) an electrically conductive material having first and second opposed surfaces and having an electroluminescent coating on one surface thereof, and an uncoated border around the periphery thereof;
    (2) an electrically conductive coating disposed about the periphery of the electroluminescent coating;
    (3) an insulating material disposed about the periphery of the electrically conductive coating; but not in contact therewith;
    (4) a laminate having a phosphorous coating encapsulating the electrically conductive material, the laminate being in contact with the electroluminescent coating;
  (b) a means for generating an electric current through the conductive material and being in electrical communication with a source of power; and
  (c) a housing for the lighting element, the housing including means for attachment to a convertible top.

The electroluminescent dome light of the present invention is flexible enough to be used for a convertible top vehicle and thin enough to fit within the reduced head space resulting with a convertible top vehicle.

For a more complete understanding of the present invention reference is made to the following detailed description and accompanying drawing. In the drawing like reference characters refer to like parts throughout the several means, in which:

DESCRIPTION OF THE PREFERRED EMBODIMENT

Figure 1:
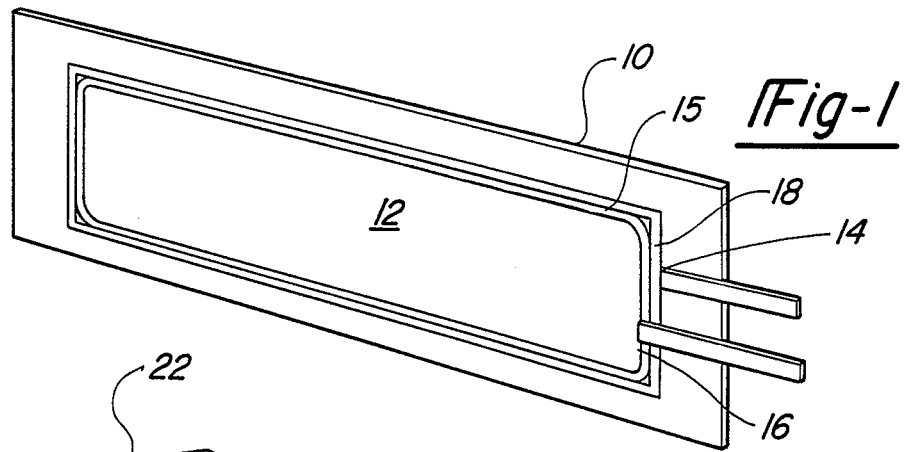
FIG. 1 is a perspective view of the lighting element hereof.

Now, and with reference to the drawing and, in particular, to FIG. 1, the present invention includes a lighting element 10. The lighting element, generally, comprises a thin strip of electrically conductive material 11 such as aluminum. An electroluminescent coating 12 such as Indium Tin Oxide, (InSnO), is deposited on one side or surface of the strip. The opposite or other side or surface is uncoated. The uncoated side defines an anode 14.

Disposed about the periphery of the electroluminescent coating, is a border of electrically conductive material 15, such as, copper or silver. This electrically conductive material forms a cathode 16.

A thin border on the cathode surface is uncoated around the outer periphery of the electrically conductive material. An insulating material 18 such as mylar, is applied to this thin border.

Figure 2:
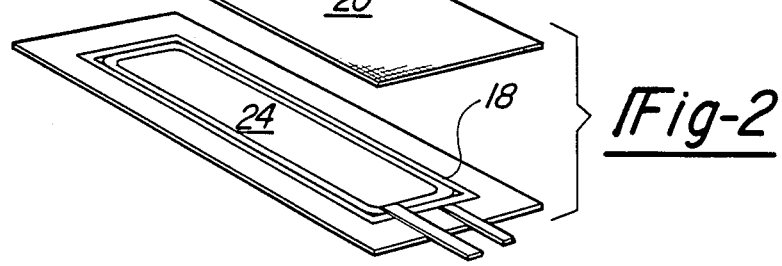
FIG. 2 is an exploded, perspective view of the laminate with a light diffusing coating.

As shown in FIG. 2, the electroluminescent element is encased in a laminating material or laminate 20. The laminate has a phosphorous coating 22 deposited on the interior surface thereof. The laminate with the phosphorous or similar type coating 24, is in contact with the electroluminescent coating. The phosphorous coating acts as a lens to diffuse and intensify the light given off from the electroluminescent coating, and gives the light the quality of incandescent lighting.

Figure 3:
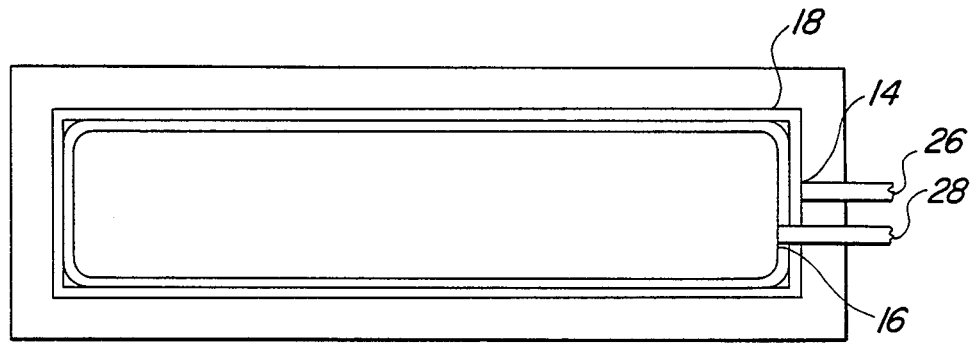
FIG. 3 is a frontal view of the lighting element hereof with attached electrical connectors.

As shown in FIG. 3, attached to the electroluminescent element are two electrical connectors 26, 28, made of copper or other electrically conductive material. The connectors provide a means of generating electrical current through the conductive material. The connectors are attached to opposite sides of the element with a space between the connectors. One connector 28 is attached to the cathode 16 on the electroluminescent coating, the other connector 26 is attached to the anode 14 on the uncoated side of the element. The insulating border 18 prevents a short circuit by preventing both connectors from touching the anode or cathode.

The connectors attach to a power source (not shown) of the vehicle through wires (not shown) which run from the electroluminescent element connector through the linkages of the top stack of the convertible vehicle, to the power source. An inverter (not shown), between the power source and the light source converts the direct current to alternating current at a special operating frequency.

The dome light operates when the vehicle door is opened, or the inside switch is turned to the "on" position. The switch creates a closed circuit which allows electrical current to flow through the wires to the lighting element. The electrical current passes through the connecting wires to the cathode located on the electroluminescent element. Here the current excited the electrons. The electrons in the excited state reach a threshold voltage that allows them to pass through the barrier of the electroluminescent material. At this voltage the electroluminescent material emits energy in the form of photons or light energy. The light emitted from the electroluminescent material is diffused through the phosphorous treated laminate. The laminate acts as a lens or filter, and gives the light an incandescent quality.

Figure 4:
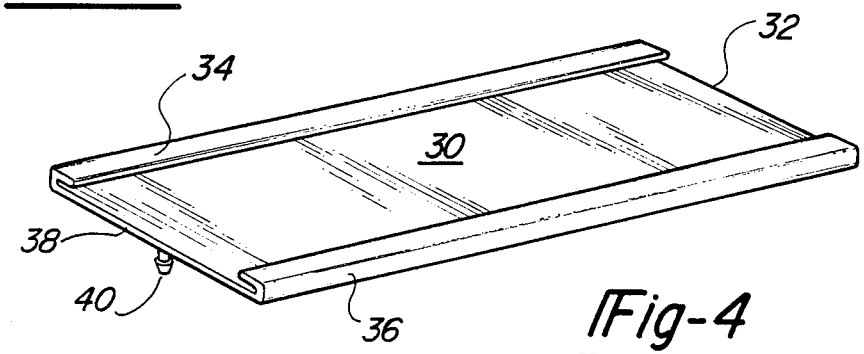
FIG. 4 is a perspective view of the housing for the lighting element.

As noted hereinabove the electroluminescent element is held securely in place on the headliner of the vehicle by a housing shown in FIG. 4. The housing 30 comprises a back wall 32 and two side walls 34, 36 and a lip 38, or opening to receive the element. The housing may be constructed of a thin flexible plastic. The housing is secured to the headliner fabric by at least one tab or pin 40, which may be hard plastic or metal. The tab or pin has an outwardly pointed terminus that projects from the housing. The tab pierces the headliner fabric, and can be bent to secure the housing in place.

This electroluminescent dome light being thin in nature provides the requisite thinness, necessary to fit a dome light into the reduced head space of the convertible.

Further, the thin laminating material provides the flexibility necessary for a dome light in the convertible top. The filament may be any shape or size and the housing which provides a means of securing the lighting element to the headliner of the convertible is thin and flexible as well. The element is attached by electrical connectors to connecting wires which run along the top stack of the convertible and are folded into the top stack when the top is down.

The electroluminescent dome light provides a convenient source of illuminates making it possible to read in the automobile or locate items which cannot be found in the dark vehicle The electroluminescent dome light affords the vehicle occupant additional convenience and safety.

Because of its thinness and flexibility the electroluminescent light is versatile and can be used in many pieces where space constraints would prevent use of incandescent or other lighting fixtures.

Having described the invention, what is claimed is:

1. An electroluminescent dome light for a convertible-type vehicle comprising:
   (a) a lighting element comprising:
      (1) an electrically conductive material having an electroluminescent coating on one side, of the material;
      (2) an electrically conductive coating disposed about the periphery of the electroluminescent coating;
      (3) an insulating material disposed about the periphery of the electrically conductive coating; and
      (4) a light diffusing coating comprising a phosphorous-treated laminate encapsulating the electrically conductive material, the light diffusing coating having coating with the electroluminescent coating; and
   (b) means for generating an electric current through the conductive material; and
   (c) a housing for the lighted element, the housing including a means for attachment to a convertible top.

2. The dome light of claim 1 wherein:
   (a) the electrically conductive material is aluminum; and
   (b) the electroluminescent material is a blend of phosporescent elements.

3. The dome light of claim 1 wherein the laminate material is mylar or arlar.

4. The dome light of claim 3 further comprising:
   a pair of electrical connectors for connecting the lighting element to a power source.

5. The dome light of claim 4 further comprising:
   a housing comprising:
   (a) a back wall and two side walls;
   (b) an opening to receive the lighting element; and
   (c) a pin comprising a flexible metal material having an upwardly pointed terminus that projects from the housing into the convertible top headliner to secure the housing to the headliner of the vehicle.

6. The housing of claim 5 further comprising:
   a tab comprising a flexible plastic material, having an outwardly pointed terminus, for securing the housing to the headliner of the vehicle.

7. An electroluminescent light for the interior lighting of a vehicle comprising:
   (a) a lighting element comprising:
      (1) an electrically conductive material having an electroluminescent coating on one side, of the material;
      (2) an electrically conductive coating disposed about the periphery of the electroluminescent coating;
      (3) an insulating material disposed about the periphery of the electrically conductive coating; and
      (4) a light diffusing coating comprising a phosphorus-treated laminate encapsulating the electrically conductive material, the light diffusing coating having contact with the electroluminescent coating; and
   (b) means for generating an electric current through the conductive material; and
   (c) a housing for the lighting element, the housing including a means for attachment of the housing to the interior of the vehicle.

8. The light of claim 7 wherein:
   (a) the electrically conductive material is aluminum; and
   (b) the electroluminescent material is a blend of phosphorescent elements.

9. The light of claim 10 wherein the laminate material is mylar or arlar.

10. The light of claim 9 further comprising:
    a pair of electrical connectors for connecting the lighting element to a power source.

11. The light of claim 10 wherein the housing further comprises:
    (a) a back wall and two side walls;
    (b) an opening to receive the lighting element; and
    (c) securement means comprising a flexible metal material having an outwardly pointed terminus the terminus projecting from the housing into the vehicle fabric surface in the interior of the vehicle to secure the housing to the interior of the vehicle.

12. The light of claimm 11 wherein the securement means comprises:
    a tab, the terminus of the tab penetrating the soft cloth fabric of the interior of the vehicle.

13. An electroluminescent dome light for a convertible-type vehicle comprising:
    (a) a lighting element comprising:
       (1) an aluminum electrically conductive material having an electroluminescent coating which comprises a phosphorescent blend wherein the coating is applied to one side of the material;
       (2) an electrically conductive coating disposed about the periphery of the electroluminescent coating;
       (3) an insulating material disposed about the periphery of the electrically conductive coating; and
       (4) a light diffusing coating comprising a phosphorus-treated mylar or arlar laminate encapsulating the electrically conductive material, the light diffusing coating having contact with the electroluminescent coating;
(b) means for generating an electric current through the conductive material; and
(c) a housing for the lighting element comprising a back wall and two side walls, an opening to receive the lighting element, and a pin comprising a flexible material having an outwardly pointed terminous that projects from the housing into the convertible top headliner to secure the housing to the headliner of the vehicle.

14. An electroluminescent light for the interior lighting of a vehicle comprising:
(a) a lighting element comprising:
  (1) an aluminum, electrically conductive material having an electroluminescent coating on one side of the material, the electroluminescent coating comprising a phosphorescent blend;
  (2) an electrically conductive coating disposed about the periphery of the electroluminescent coating;
  (3) an insulating material disposed about the periphery of the electrically conductive coating; and
  (4) a light diffusing coating comprising a phosphorus-treated mylar or arlar laminate encapsulating the electrically conductive material, the light diffusing coating having contact with the electroluminescent coating;
(b) means for generating an electric current through the conductive material; and
(c) a housing for the lighting element, comprising: a back wall and two side walls, an opening to receive the lighting element, and a pin comprising a flexible material having an outwardly pointed terminous that projects from the housing into the vehicle interior to secure the housing to the vehicle.

* * * * *